United States Patent [19]

Watanabe et al.

[11] 3,992,709
[45] Nov. 16, 1976

[54] DOPPLER RADAR

[75] Inventors: Masahiro Watanabe, Sagamihara; Hideo Shibuya, Yokohama, both of Japan

[73] Assignees: Matsushita Electric Industrial Company, Ltd.; Toyota Jidosha Kogyo Kabushiki Kaisha, both of Japan

[22] Filed: Apr. 12, 1976

[21] Appl. No.: 675,816

Related U.S. Application Data

[63] Continuation of Ser. No. 486,760, July 9, 1974, abandoned, which is a continuation of Ser. No. 307,970, Nov. 20, 1972, abandoned.

[30] Foreign Application Priority Data

Nov. 24, 1971  Japan.............................. 46-94774

[52] U.S. Cl...................................... 343/7.5; 343/8
[51] Int. Cl.²............................................. G01S 9/44
[58] Field of Search................................. 343/7.5, 8

[56] References Cited
UNITED STATES PATENTS

| | | | |
|---|---|---|---|
| 3,118,140 | 1/1964 | Vladimir et al. | 343/8 |
| 3,159,833 | 12/1964 | Greenwood, Jr. | 343/8 |
| 3,341,847 | 9/1967 | Fried et al. | 343/7.5 |
| 3,710,385 | 1/1973 | Howard et al. | 343/8 X |

FOREIGN PATENTS OR APPLICATIONS

| | | |
|---|---|---|
| 977,277 | 9/1965 | Germany |
| 1,416,178 | 4/1972 | Germany |
| 867,709 | 2/1953 | Germany |

*Primary Examiner*—Malcolm F. Hubler
*Attorney, Agent, or Firm*—Stevens, Davis, Miller & Mosher

[57] ABSTRACT

A Doppler radar for use in a vehicle for predicting a collision with another vehicle, capable of detecting noise due to a false wave i.e., the transmitted wave from another vehicle having a frequency in the vicinity of the true transmitted wave frequency and having entered through a receiver antenna into a mixer, and controlling the frequency of the true transmitted wave to depress said noise to zero, thereby avoiding the interference of the false wave with the Doppler signal output.

7 Claims, 10 Drawing Figures

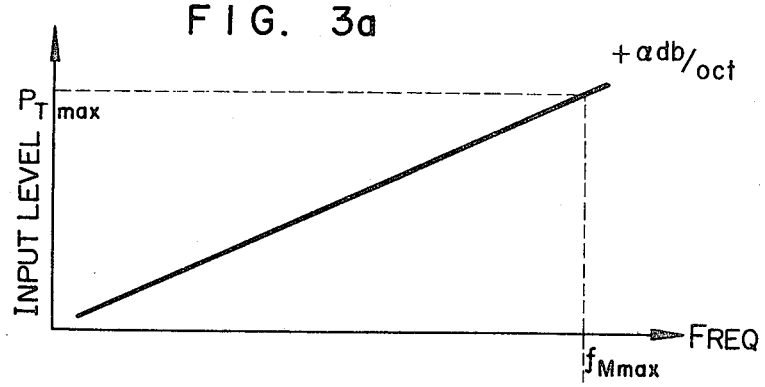
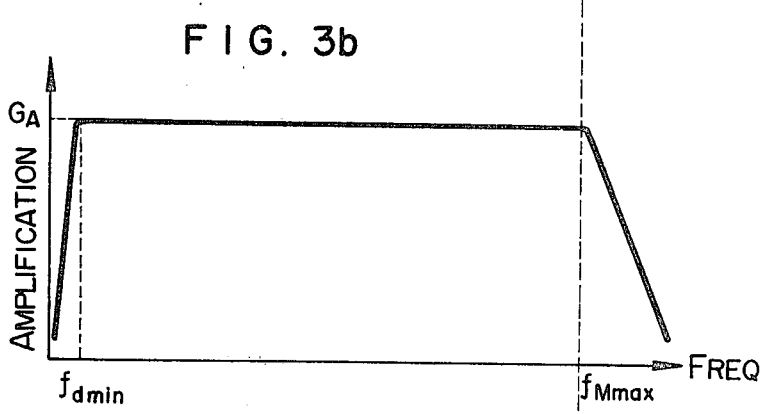
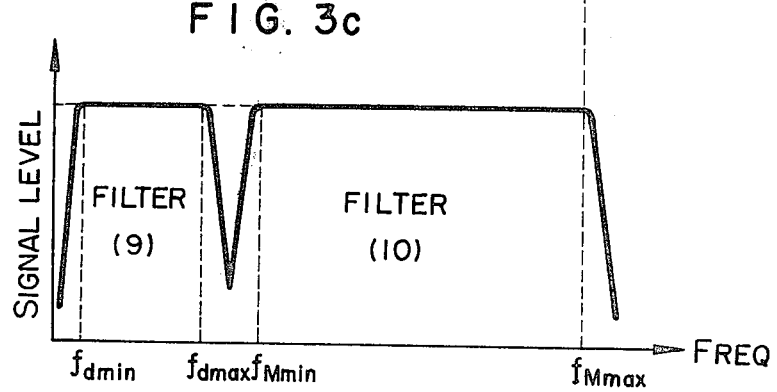

DOPPLER RADAR

This is a continuation of application Ser. No. 486,760 filed July 9, 1974, now abandoned, which in turn is a continuation of Ser. No. 307,970 filed Nov. 20, 1972(now abandoned).

This invention relates to a Doppler radar and more particularly to a Doppler radar for predicting a collision with a vehicle, capable of avoiding the interference of a false wave having a frequency in the vicinity of the true transmitted wave frequency.

Doppler radar is a radar system in which a microwave shape in a narrow beam is radiated (directed) to a moving object and the reflected wave, subjected to a frequency change in proportion to the velocity of the moving object by the Doppler effect, is detected and used for estimating the velocity of the moving object.

When a false wave having a frequency near the true transmitted wave frequency is allowed to enter the mixer of the Doppler radar, it may generate noise in the frequency band of the Doppler signal even if the frequency difference between the false wave and the true transmitted wave is out of the frequency band of the Doppler signal. Namely, microwave oscillator such as Gunn diodes and IMPATT diodes oscillate not at a single frequency but in a certain frequency range even in the absence of modulation due to FM and/or AM noise. Thus, even when the difference of the mean frequencies of the true and the false waves is not of the Doppler frequency region, noise for the Doppler signal appears if the true and the false waves are mixed in a mixer and a signal component having a frequency in the Doppler frequency region appears in the mixer output.

Conventionally, no countermeasures are usually made against the interference of a false wave entering into the mixer of a Doppler radar, or else a special frequency modulation may be applied to the transmitted wave to reduce the disturbance. But, the reduction of the disturbance is not sufficient and a more effective method of avoiding the disturbance is desired.

This invention provides a method which solves the above problem.

An object of the present invention is to provide a Doppler radar comprising in the following stage of a mixer for mixing a pair of the transmitted wave and the reflected wave from a moving object to produce a Doppler signal;

A filter for allowing those components of the output of said mixer which is produced by mixing of a part of the transmitted wave and a false wave which can cause interference with the Doppler signal; and means for varying the frequency of the transmitted wave to bring said frequency differences outside said region capable of causing interference, said means being controlled by the output of said filter.

Now, embodiments of the present invention will be described refering to the accompanying drawings, in which:

FIGS. 3a to 3d are characteristic curves of the main portion of the embodiment of FIG. 1.

Figure 1:
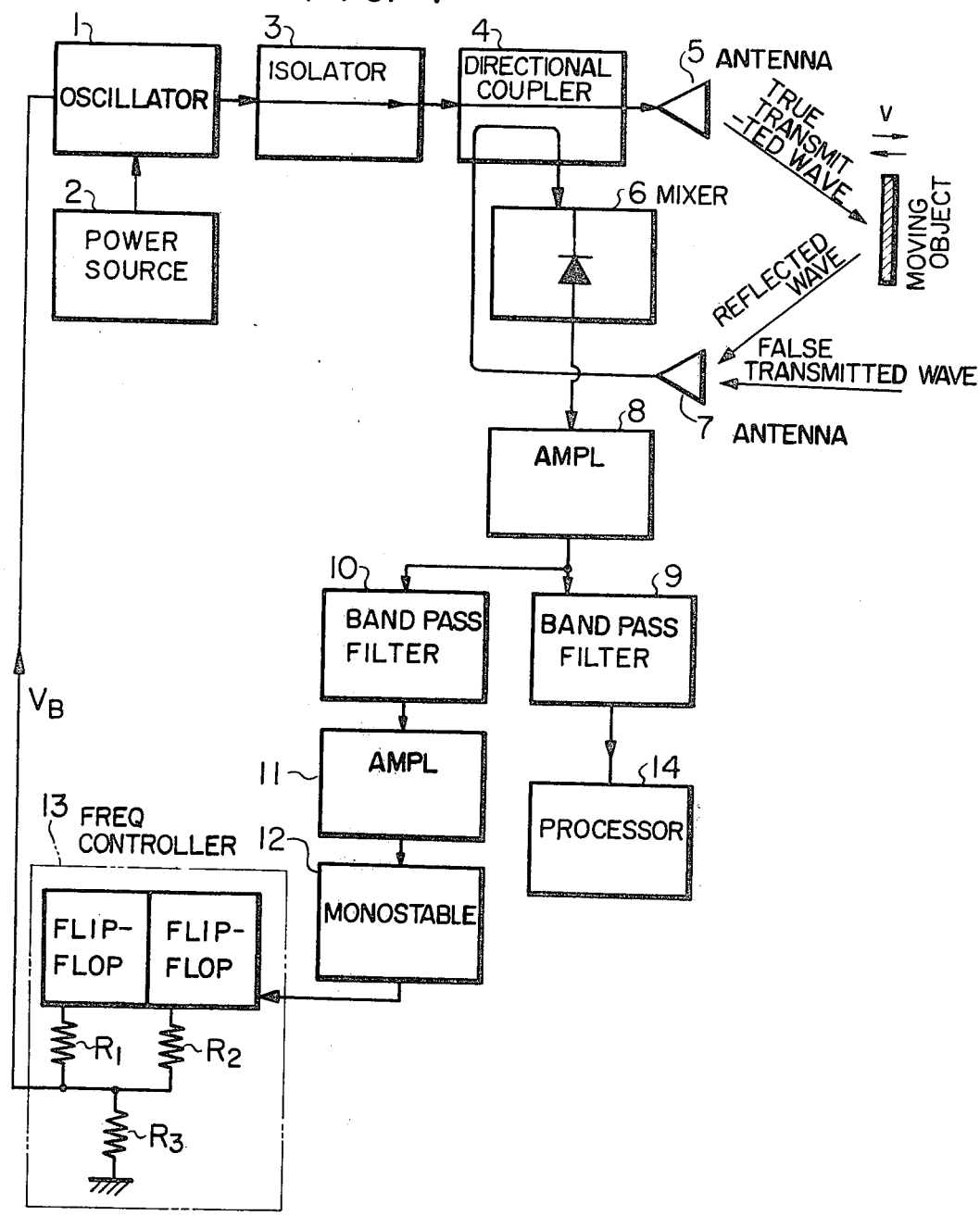
FIGS. 1 and 2 are block diagrams of two concrete embodiments of the present invention.

FIG. 1 shows an embodiment of a Doppler radar system comprising an oscillator 1 provided with a frequency modulator in which the oscillation frequency can be varied by varying the DC bias voltage of a varactor diode, a power source 2 for supplying power to the oscillator 1, an isolator 3 for preventing the load, a false wave, if any, and true waves from directly influencing to the oscillator 1, a directional coupler 4 for supplying a larger portion of the output of the oscillator 1 to a transmitting antenna 5 and a smaller portion to a mixer 6 and supplying a larger portion of the reflected wave received through a receiving antenna to the mixer 6, a transmitting antenna 5 for irradiating the greater portion of the output of the oscillator 1 to a moving object, a mixer 6 for receiving a portion of the output of the oscillator 1 and the reflected wave received through the antenna 7 and mixing them, a receiving antenna 7 for receiving the wave transmitted from the transmitting antenna 5 and reflected from a moving object, a first amplifier 8 for amplifying the output of the mixer 6, a band pass filter 9 for selectively transmitting signals in the Doppler frequency region to derive the Doppler signal from the output of the amplifier 8, another band pass filter 10 for transmitting signal components in a selected frequency region but except those in the Doppler frequency region, i.e. the transmission regions of the filters 9 and 10 do not overlap, thereby to discriminate the presence or absence of a false wave by the presence or absence of the output of this band pass filter 10, a second amplifier 11 for amplifying the output of the band pass filter 10, a trigger signal generating circuit 12 composed of a monostable circuit for generating a trigger pulse with a fixed pulse width when the output of the amplifier 11 reaches a threshold level $D_{min}$, an oscillation frequency controlling circuit 13 consisting of two bistable circuits and a group of resistances $R_1, R_2, R_3$ forming a voltage divider for changing the output voltage $V_B$, which becomes the DC bias voltage for the varactor diode for changing the frequency in the oscillator 1, every time an output of the trigger signal generating circuit 12 is supplied, and a Doppler signal processor circuit 14 for deriving the output of the band pass filter 9 above a certain threshold level $D_{min}$ containing information on the relative distance and velocity of the moving object and the car equipped with this Doppler radar, and processing it by waveform shaping, integration, etc. to provide a final result of the velocity and distance. The function of this circuit will be described referring to FIGS. 3a to 3d.

It is assumed that for the normal operation of the Doppler signal processor circuit 14, the input signal should have an S/N ratio larger than $\beta$. Then, the maximum allowable noise level $N_{max}$ in the output of the Doppler band pass filter 9 is expressed by $$20 \log N_{max} = 20 \log D_{min} - \beta,$$

where $D_{min}$ is the threshold level of the circuits 12 and 14. When the noise in the Doppler band due to the mixing of a false wave is $N_{max}$ when it is calculated in terms of the output of the Doppler band filter 9, the relation between the false wave input level at the mixer 6 and the frequency difference $\Delta f$ of the mean frequencies of the true and the false wave is shown in FIG. 3a. Here, it is assumed that the true transmitted wave level in the mixer 6 is constant in the related frequency region. FIG. 3a indicates that when a false wave is allowed to enter into the mixer, the noise level in the frequency spectrum of the mixer output is largest at the frequency of the mean frequency difference of the true and the false waves and decreases as it departs from there with a frequency dependence of $-\alpha$ db/oct. Mark $f_{Mmax}$ is the frequency difference of the true and the false waves at which a noise of $N_{max}$, calculated in terms of the Doppler band pass filter 9 output, is generated when a false wave input of the largest possible level $P_{T'\ max}$ is allowed to mix into the mixer 6.

FIG. 3b shows the amplification characteristic of the first amplifier 8. It is assumed that the mixer 6 has a gain characteristic independent of the frequency at least in the frequency region of $f_{dmin}$ to $f_{Mmax}$. Thus, if the mixture level of a false wave is constant, the output level of the mixer 6 is constant regardless of the value of $\Delta f$ in the region of $f_{dmin}$ to $f_{Mmax}$.

FIG. 3c shows the transmission spectrum of the band pass filters 9 and 10. The Doppler band pass filter 9 transmits the signal components in the frequency region of $f_{dmin}$ to $f_{dmax}$ and the other band pass filter 10 transmits those in the frequency region of $f_{Mmin}$ to $f_{Mmax}$. Thus, the output of the mixer 6 is amplifier in the amplifier 8 and then divided into two components, i.e. the Doppler band component and the higher frequency band component.

Figure 3D:
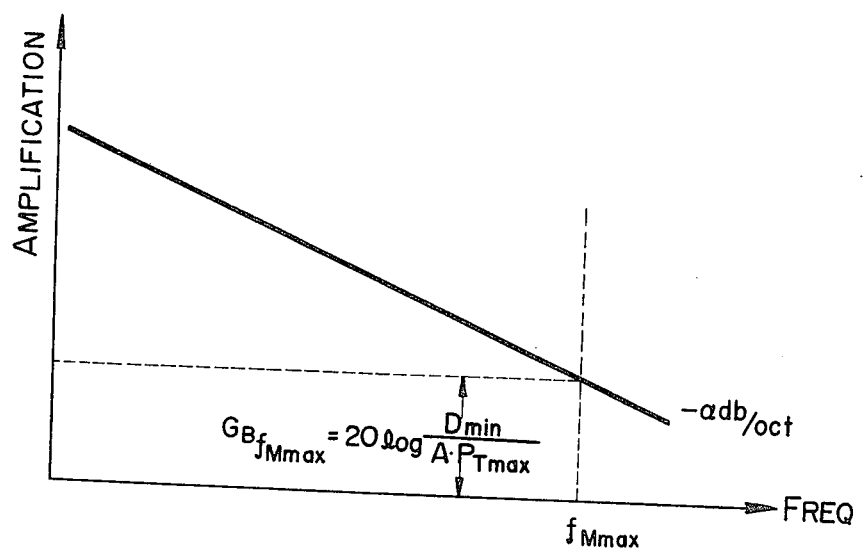

FIG. 3d shows the amplification characteristic of the amplifier 11. The output level of the mixer 6 for a false wave input is approximately proportional to the input level, the proportionality constant being taken as A. When the input level at the mixer 6 is $P_{T\ max}$, the output level of the mixer 6 becomes $A\ P_{T\ max}$. Further, the frequency difference of the true and the false wave is assumed to be equal to $f_{Mmax}$, i.e. the output of the mixer 6 has the maximum level around $f_{Mmax}$. The gain of the amplification 11 should be $$\frac{D_{min}}{A\ P_{T\ max}};$$

i.e. if the amplification of the amplifier 11 at the frequency $f_{Mmax}$ is set $G_B f_{Mmax}$, $$G_B f_{M\ max} = \frac{D_{min}}{A\ P_{T\ max}}.$$

This is because when a false wave of $f = f_{Mmax}$ is mixed into the mixer 6 at a level $P_{T\ max}$, the noise in the Doppler band becomes $N_{max}$ and the output of the amplifier 11 should be equal to the threshold level $D_{min}$ as the input for the trigger pulse generating circuit 12. It will be easily understood that the gain of the amplifier 11 for other frequencies becomes as shown in FIG. 3d from the above description and FIG. 3a.

Each time when a trigger pulse is generated from the trigger pulse generating circuit 12, the output $V_B$ of the frequency controller 13 is changed successively as $V_{B1} - V_{B2} - V_{B3} - V_{B4} - V_{B1} -$ and then the oscillation frequency $f_T$ of the oscillator 1 is changed as $f_{T1} - f_{T2} - f_{T3} - f_{T4} - f_{T1} -$. In the above and the following description, the threshold levels of the trigger signal generating circuit 12 and the Doppler signal processing circuit 14 are assumed to be equal.

Figure 4A:
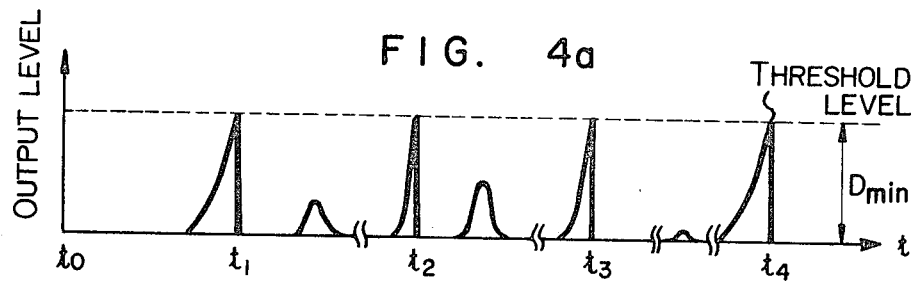
FIGS. 4a to 4d are characteristic curves for illustrating the operation of the embodiment of FIG. 1.
Figure 4B:
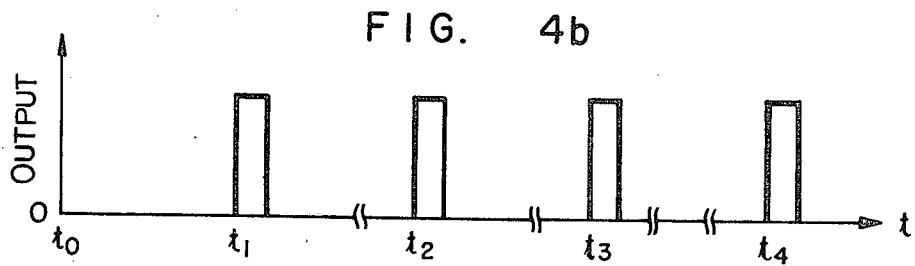
Figure 4C:
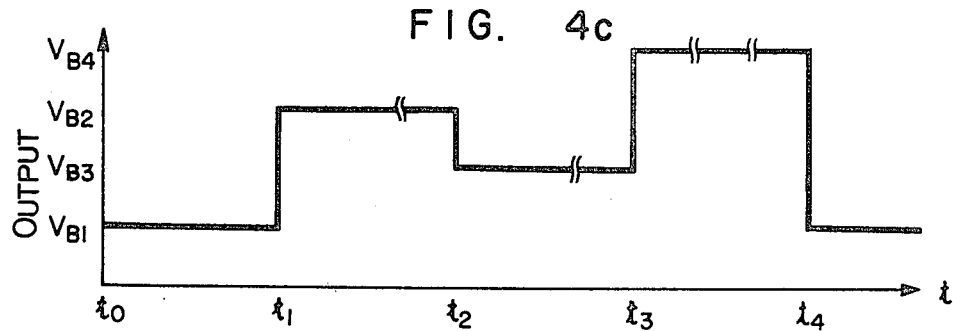
Figure 4D:
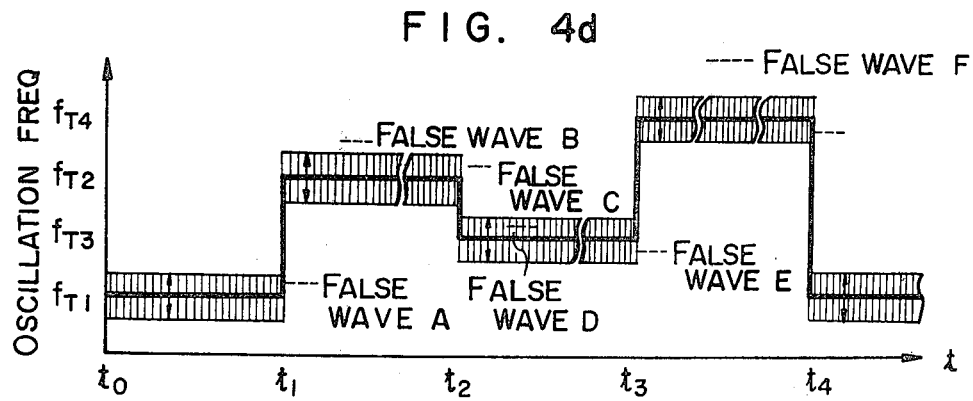

FIGS. 4a to 4d show the timing chart in which: FIG. 4a shows the output level of the amplifier 11 with respect to time; FIG. 4b shows the output of the trigger pulse generating circuit 12; FIG. 4c shows the output of the oscillation frequency controlling circuit 13; and FIG. 4d shows the oscillation frequency of the oscillator 1 (solid line), region, as indicated by an arrow, of the mean frequency of wave false wve which can disturb the true signal ($f_T \pm f_{Mmax}$), and the mean frequencies of false waves (broken lines).

The operation of the system of FIG. 1 will be described referring to FIGS. 3a to 3d and 4a to 4d. First, in the case where no false wave exists near the oscillation frequency $f_T$ of the oscillator 1, the output of the oscillator 1 (true wave) passes through the isolator 3 and is supplied mainly to the transmitting antenna 5 and partially to the mixer 6 by the directional coupler 4. The signal supplied to the transmitting antenna 5 is irradiated to a moving object and the reflected wave from the object is received with the receiving antenna 7. This reflected wave received through the antenna 7 passes through the directional coupler 4 and is sent to the mixer 6 and mixed with a part of the transmitted wave. The output of the mixer 6 is amplified by the amplifier 8 having the characteristic as shown in FIG. 3b, allowed to pass through the Doppler band pass filter 9 and then supplied to the processor circuit 14 as the signal having a Doppler frequency $f_d$ corresponding to the relative velocity of the moving object. In this case, no signal is allowed to pass through the filter 10 and amplified by the amplifier 11 and hence no output is generated from the trigger pulse generating circuit 12. In this state, the output $V_B$ of the oscillation frequency controlling circuit 13 does not change also and no change occurs in the oscillation frequency of the oscillator 1 (FIGS. 4a to 4d, period $t_0$ to $t_1$).

In the case where a false wave having a frequency near the oscillation frequency $f_T$ is received with the receiving antenna 7, the input of the mixer 6 includes a part of the transmitted wave from the oscillator 1, the reflected wave from a moving object, and a false wave, thereby generating a Doppler signal output and a mixed output of a part of transmitted wave from oscillator 1 and a false wave. The components of the mixed output of said part of the transmitted wave and the false wave having a frequency in the Doppler frequency band become noise to the Doppler signal.

When those portions of the mixed output of the transmitted wave and the false wave which are allowed to pass through the band pass filter 10 and amplified in the amplifier 11 become above the threshold level $D_{min}$, a trigger pulse is generated from the trigger signal generating circuit 12. Then, the output $V_B$ of the oscillation frequency controlling circuit 13 is changed as shown in FIG. 4c at times $t_1, t_2, t_3,$ and $t_4$ so as to bring the mean frequency difference of the transmitted and the false waves out of the frequency region in which the false wave can disturb the Doppler signal. After the frequency shift, the false wave can no longer disturb the Doppler signal. Even when a false wave is mixed into the mixer 6, if the mean frequency difference from the true wave is out of the region in which disturbance occurs (in the case of FIG. 4d, false wave B), or if a false wave level $P_T'$ is low (in the case of FIG. 4d, false wave D) the output of the amplifier 11 does not reach the threshold level $D_{min}$ and hence the transmitted wave does not change the frequency.

As is described above, even when a false wave mixes into the true transmitted wave, if the Doppler signal is above the threshold level, the signal to noise ratio S/N of the Doppler signal can set always above $\beta$ db.

Further, in the case where the noise in the Doppler band is aove $N_{max}$ calculated in terms of the output of the Doppler band filter 9 and thus the output of the amplifier 11 becomes above the threshold level to change the frequency of the transmitted wave, some noise occurs at the time of frequency change but it causes no serious problems since the Doppler signal is usually integrated in the signal processor circuit 14 for a fixed time period.

Figure 2:
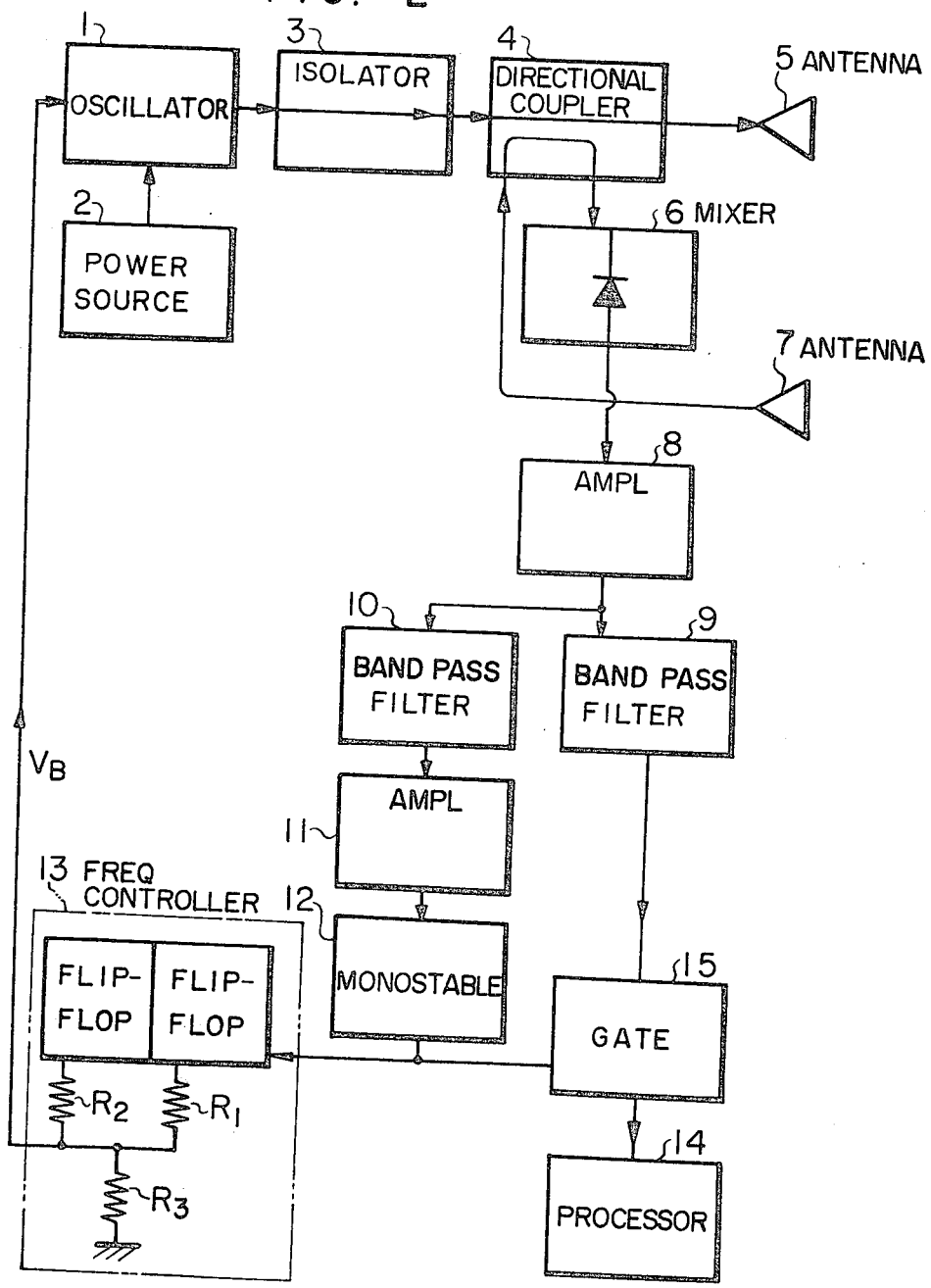

If this becomes a problem, it can be solved by modifying the system as shown in FIG. 2. In FIG. 2, reference numerals 1 to 14 indicate similar parts as those in FIG. 1 and numeral 15 indicates a gate circuit which cuts off the path from the Doppler band pass filter 9 to the Doppler signal processor circuit 14 when the output of the trigger signal generating circuit 12 is present, and supplies the output of the Doppler band pass filter 9 to the Doppler signal processor circuit 14 only when no output of the trigger signal generating circuit 12 is present. Therefore, if the pulse width of the output of the trigger signal generating circuit 12 is chosen longer than the period in which noise is generated upon the frequency shift of the transmitted wave, the influence of the noise generated upon the frequency shift on the Doppler signal processor circuit 14 can be completely eliminated.

In the above description, the transmitted wave was subjected to no modulation. The present system, however, can easily be adapted to amplitude or frequency modulation use. Further, in the above description the direction of the frequency shift of the transmitted wave was independent of the sign of the subtraction of the true transmitted wave frequency from the false wave frequency, it is also possible to shift the true wave frequency to always be separate from the false wave frequency by providing a discrimination circuit for discriminating the sign of said frequency difference.

What is claimed is:

1. A Doppler radar for measuring the relative velocity of a moving object comprising:
    a mixer for mixing a part of a transmitted wave and a reflected wave from said relatively moving object to produce a Doppler signal, the input to said mixer including a sporadically received false wave which can cause interference with said Doppler signal,
    first and second band pass filters coupled to the output of said mixer, said first filter transmitting signals in the Doppler frequency region and said second filter transmitting only components in the output of said mixer outside said Doppler frequency region which are produced by mixing said transmitted wave with said false wave,
    means coupled to said first band pass filter for receiving a continuous signal corresponding to the relative velocity of said moving object, and
    means coupled to said second band pass filter for varying the frequency of said transmitted wave to bring the mean frequency difference between said transmitted and false waves out of the frequency region wherein said false wave can disturb the Doppler signal, said frequency varying means being controlled by the output of said second filter.

2. A Doppler radar according to claim 1, in which said means coupled to said second filter comprises
    means for transforming those components in the output of said second band pass filter which are above a predetermined level into trigger signals having a predetermined pulse width; and
    a control circuit for controlling the frequency of the transmitted wave by said trigger signal so as to bring said mean frequency difference outside said frequency region in which the false wave can disturb the Doppler signal.

3. A Doppler radar according to claim 2 and for use in a vehicle for predicting the collision with another vehicle, the radar comprising a gate responsive to the Doppler signal for calculating the relative distance and velocity of the firstmentioned vehicle and said other vehicle.

4. In a Doppler radar system for measuring the relative velocity of a moving object, said system including an oscillator for generating a microwave signal; means for transmitting said microwave signal to said object and receiving a signal reflected therefrom; a mixer for mixing a part of the microwave signal generated by said oscillator and said reflected signal, the output of said mixer including a Doppler signal and a noise signal, a first band pass filter coupled to the output of said mixer for transmitting signals in the Doppler frequency region; and means coupled to said first band pass filter for receiving a continuous signal corresponding to the relative velocity of said moving object; the improvement comprising:
    second band pass filter means coupled to the output of said mixer for deriving only frequency components in the output of said mixer outside said Doppler frequency region which are produced by mixing said transmitted wave with said false wave and which can cause interference with said Doppler signal, and
    means coupled to said oscillator and responsive to the level of the frequency components derived by said second band pass filter means for shifting the frequency of said microwave signal from a first value to a second value to bring said frequency components at the output of said second band pass filter means outside a frequency band capable of causing interference, thereby avoiding interference of said noise signal with said Doppler signal.

5. A Doppler radar system defined by claim 4, wherein said means coupled to said oscillator and responsive to the frequency components derived by said second band pass filter means comprises a trigger signal generating circuit coupled to the output of said second band pass filter means and an oscillation frequency controlling circuit coupled between the output of said trigger signal generating circuit and said oscillator, said oscillation frequency controlling circuit changing the frequency of said oscillator in response to a signal from said trigger signal generating circuit.

6. An anti-jamming circuit for use in a Doppler radar system having a voltage-controlled frequency-variable oscillator, a mixer for mixing a part of a transmitted wave and reflected wave to produce a Doppler signal and a false wave, a first band pass filter coupled to the output of said mixer for transmitting signals in the Doppler frequency region, and means coupled to said first band pass filter for receiving a continuous signal corresponding to the relative velocity of said moving object comprising, second band pass filter means connected to the output of said mixer for deriving only those components in the output of said mixer outside said Doppler frequency region which are produced by mixing said transmitted wave and said false wave and are capable of interfering with said Doppler signal; trigger means responsive to an input having a level above a given level from said second band pass filter means for producing a trigger signal having a given pulse width; and an oscillation-frequency control circuit responsive to said trigger signal for producing sequentially output voltage having different magnitudes, the output of said control circuit being coupled with said frequency-variable generator to shift the oscillation frequency of the generated signal to a frequency band free from the interference of said false wave with the Doppler signal in accordance with the output voltage from said control circuit.

7. An anti-jamming circuit as defined by claim 6, wherein said trigger means comprises a monostable circuit; and said oscillation frequency control circuit comprises first and second bistable circuits and a voltage divider coupled to the outputs of said bistable circuits, said voltage-controlled frequency-variable oscillator being coupled to said voltage divider.

* * * * *